United States Patent
Kim

(10) Patent No.: US 9,877,286 B2
(45) Date of Patent: Jan. 23, 2018

(54) SIGNAL TRANSMITTING CIRCUIT TO REDUCE POWER IN STANDBY STATE

(71) Applicant: SAMSUNG ELECTRONICS CO., LTD., Suwon-si (KR)

(72) Inventor: Sung-ha Kim, Yongin-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/380,237

(22) Filed: Dec. 15, 2016

(65) Prior Publication Data
US 2017/0181081 A1 Jun. 22, 2017

(30) Foreign Application Priority Data
Dec. 16, 2015 (KR) .................. 10-2015-0180212

(51) Int. Cl.
*H04B 1/04* (2006.01)
*H04W 52/02* (2009.01)
*H04L 7/00* (2006.01)

(52) U.S. Cl.
CPC ........ *H04W 52/028* (2013.01); *H04B 1/0483* (2013.01); *H04L 7/0091* (2013.01)

(58) Field of Classification Search
CPC ... H04W 52/028; H04B 1/0483; H04L 7/0091
USPC ..................................... 455/127.5
See application file for complete search history.

(56) References Cited

U.S. PATENT DOCUMENTS

| 6,675,305 | B1 | 1/2004 | Mohammad |
| 6,950,960 | B2 | 9/2005 | Mohammad |
| 7,197,341 | B2* | 3/2007 | Bultan .............. H04W 52/0248 455/343.2 |
| 7,308,593 | B2 | 12/2007 | Jacobson et al. |
| 8,312,307 | B2 | 11/2012 | Hays |
| 8,621,128 | B2 | 12/2013 | Radulescu et al. |
| 8,972,646 | B2 | 3/2015 | Ranganathan et al. |
| 9,042,363 | B2 | 5/2015 | Brown et al. |
| 2003/0018925 | A1 | 1/2003 | Mohammad |
| 2005/0053019 | A1* | 3/2005 | van Engelen ......... H04L 5/1438 370/276 |
| 2006/0156046 | A1 | 7/2006 | Jacobson et al. |
| 2009/0119524 | A1 | 5/2009 | Hays |
| 2011/0138096 | A1 | 6/2011 | Radulescu et al. |
| 2013/0262731 | A1 | 10/2013 | Ranganathan et al. |
| 2014/0098728 | A1 | 4/2014 | Brown et al. |

* cited by examiner

*Primary Examiner* — Sanh Phu
(74) *Attorney, Agent, or Firm* — Sughrue Mion, PLLC

(57) ABSTRACT

A transmitting circuit includes a serializer that converts parallel data into serial data based on a clock signal, a driver that generates differential signals based on the serial data, and a clock buffer that provides the clock signal to the serializer. In a standby state, the clock buffer cuts off the clock signal and the serializer outputs the serial data according to a reset signal such that standby differential signals indicating the standby state are generated by the driver irrespective of the clock signal.

18 Claims, 10 Drawing Sheets

SIGNAL TRANSMITTING CIRCUIT TO REDUCE POWER IN STANDBY STATE

CROSS-REFERENCE TO RELATED APPLICATIONS

This U.S. non-provisional patent application claims priority under 35 USC §119 from Korean Patent Application No. 10-2015-0180212, filed on Dec. 16, 2015, the entirety of which is hereby incorporated by reference.

BACKGROUND

Apparatuses, devices and articles of manufacture consistent with the present disclosure relate to interface techniques and, more particularly, to a signal transmitting circuit to save power in a standby state.

Today, various types of electronic devices are being used. An electronic device may solely perform its own functions. Moreover, the electronic device may perform its own functions while exchanging signals and data with another electronic device. An interface technique is used to exchange signals and data between two electronic devices. As various types of electronic devices become available, types of interface protocols are increasing.

For example, Mobile Industry Processor Interface (MIPI) Alliance proposed an interface protocol using "UniPro" as a link layer to unify the interfacing procedure of mobile devices.

SUMMARY

It is an aspect to provide a transmitting circuit that reduces power consumption in a standby state.

According to an aspect of an exemplary embodiment, there is provided a transmitting circuit that includes a serializer configured to convert parallel data into serial data based on a clock signal, a driver configured to generate differential signals based on the serial data, and a clock buffer configured to provide the clock signal to the serializer. In a standby state, the clock buffer may cut off the clock signal and the serializer may output the serial data according to a reset signal such that standby differential signals indicating the standby state are generated by the driver irrespective of the clock signal.

According to another aspect of an exemplary embodiment, there is provided a transmitting circuit that includes a serializer configured to convert parallel data into serial data based on a clock signal; a driver configured to generate differential signals based on the serial data; and a standby mode driver configured to generate, in a standby state, standby differential signals indicating the standby state independently of a state of the serializer in the standby state. In the standby state, the serializer is disabled according to a reset signal and the standby mode driver outputs the standby differential signals.

According to another aspect of an exemplary embodiment, there is provided a transmitting circuit that includes a digital logic configured to generate control signals to operate the transmitting circuit in a hibernate state, a stall state, a prepare state, and a burst state; an output circuit configured to generate and output differential signals; and a clock buffer configured to buffer a clock signal based on one of the control signals. When the digital logic generates the control signals to operate the transmitting circuit in the stall state, the clock buffer cuts off the clock signal based on one of the control signals, and the output circuit outputs stall state differential signals whose difference value is less than a difference value of the differential signals output in each of the burst state, the prepare state, and the hibernate state.

BRIEF DESCRIPTION OF THE DRAWINGS

The forgoing and other aspects will be described below in more detail with reference to the accompanying drawings of non-limiting example embodiments in which like reference characters refer to like parts throughout the different views, and in which.

DETAILED DESCRIPTION

Figure 1:
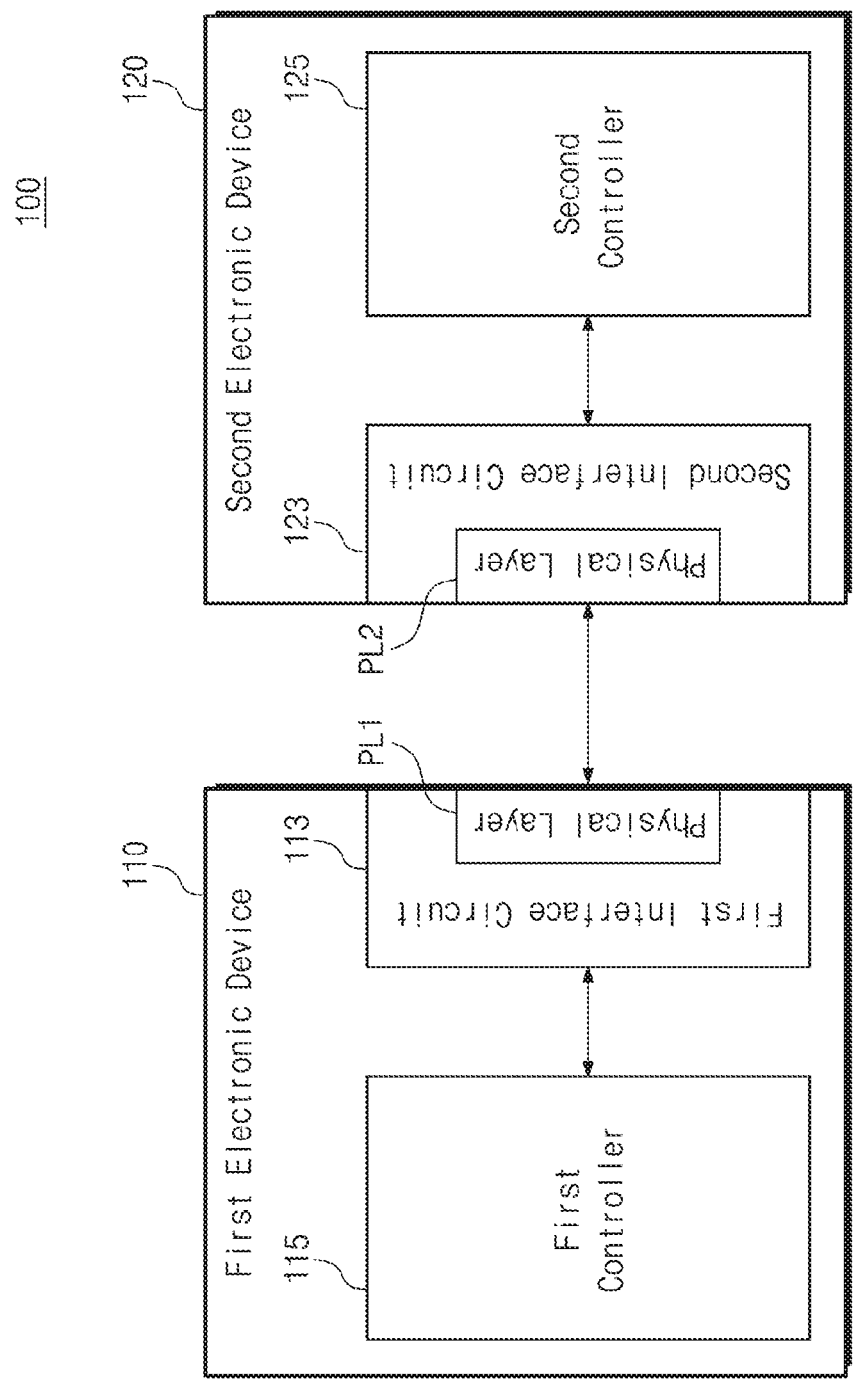
FIG. 1 is a block diagram illustrating a configuration of an electronic system according to example embodiments.

Example embodiments will now be described more fully with reference to the accompanying drawings, in which some example embodiments are shown. Example embodiments may, however, be embodied in many different forms and should not be construed as being limited to the example embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may be omitted. It should be noted that the drawings are not necessarily to scale, emphasis instead being placed upon illustrating principles of inventive concepts.

The "UniPro" proposed by the MIPI Alliance supports a physical layer that is referred to as "PHY". A physical layer of an interface circuit, such as PHY, includes a transmitter and a receiver to exchange a signal with another interface circuit.

For example, a physical layer of a mobile device may be defined by an "M-PHY" specification. The M-PHY is an interface protocol proposed by the MIPI Alliance. According to the M-PHY specification, a transmitter operates in a high-speed mode or a low-speed mode. The transmitter uses various operation states to reduce power consumption. For example, the operation state of the transmitter may include a hibernate state, a stall state (in the high-speed mode) or a sleep state (in the low-speed mode), a prepare state, and a burst state. In case of the hibernate state and the stall or sleep state, the transmitter does not receive data and operates at low power. In the prepare state, the transmitter does not receive data but operates at normal power. In the burst state, the transmitter transmits data and operates at normal power. However, since a reference clock is still being supplied to the transmitter in the stall or sleep state, a difference in power consumption between the stall or sleep state and the burst state is not great.

FIG. 1 is a block diagram illustrating the configuration of an electronic system 100 including two electronic devices that are connected to each other. As illustrated, the electronic system 100 may include a first electronic device 110 and a second electronic device 120. The first electronic device 110 may include a first interface circuit 113 and a first controller 115. The second electronic device 120 may include a second interface circuit 123 and a second controller 125. However, each of the first and second electronic devices 110 and 120 may further include components that are not shown in FIG. 1. The configuration shown in FIG. 1 is just exemplary for understanding of example embodiments.

In some example embodiments, the first electronic device 110 may be a host. For example, when the electronic system 100 is a mobile electronic system, the first electronic device 110 may include an application processor. In some example embodiments, the second storage device may be a storage device.

However, the inventive concepts are not limited the above-described example embodiments. For example, the function and configuration of the first electronic device 110 are interchangeable with those of the second electronic device 120. Furthermore, the first electronic device 110 and the second electronic device 120 may be different types of electronic devices. For example, each of the first and second electronic devices 110 and 120 may be one of a display device, an image sensor, a wireless communication chip, and the like. The above example embodiments are provided as an example implementation.

The first electronic device 110 may be connected to the second electronic device 120 through the first interface circuit 113. The first electronic device 110 may exchange signals and data with the second electronic device 120 through the first interface circuit 113. In example embodiments, the first electronic device 110 may exchange differential signals with the second electronic device 120.

The first interface circuit 113 may include a first physical layer PL1. The first physical layer PL1 may include physical components to exchange data with the second electronic device 120. For example, the first physical layer PL1 may include at least one transmitting circuit and at least one receiving circuit to exchange data with the second electronic device 120. The data may be exchanged via wire or wirelessly.

In some example embodiments, when the electronic system 100 is a mobile electronic system, the first physical layer PL1 may be defined by the "M-PHY" specification. The M-PHY is an interface protocol proposed by the Mobile Industry Processor Interface (MIPI) Alliance. In this example embodiment, the first interface circuit 113 may further include a link layer (not shown) to manage composition, integrity, and error of data. The link layer of the first interface circuit 113 may further include a physical adapted layer (not shown). The physical adapted layer may control the first physical layer PL1 (e.g., managing symbols of data or managing power).

However, the inventive concepts are not limited the above-described example embodiments. As will be described later, example embodiments may be applied to any interface circuit, including interface circuits that each include a plurality of transmitters. The above-described example embodiments are provided as an example implementation.

The first controller 115 may manage and control the overall operation of the first electronic device 110. In particular, the first controller 115 may process and manage data and signals exchanged through the first interface circuit 113. The first electronic device 110 may perform its own function according to the control of the first controller 115.

The second electronic device 120 may be connected to the first electronic device 110 through the second interface circuit 123. The second electronic device 120 may exchange signals and data with the first electronic device 110 through the second interface circuit 123. In example embodiments, the second electronic device 120 may exchange differential signals with the first electronic device 110.

The second interface circuit 123 may include a second physical layer PL2. The second physical layer PL2 may include physical components to exchange data with the first electronic device 110. For example, the second physical layer PL2 may include at least one transmitting circuit and at least one receiving circuit to exchange data with the first electronic device 110.

In some example embodiments, when the electronic system 100 is a mobile electronic system, the second physical layer PL2 may be defined by the M-PHY specification. In this example embodiment, the second interface circuit 123 may further include a link layer (not shown) and a physical adapted layer (not shown).

The second controller 125 may manage and control the overall operation of the second electronic device 120. In particular, the second controller 125 may process and manage data exchanged through the second interface circuit 123. The second electronic device 120 may perform its own function according to the control of the second controller 125.

In some example embodiments, when the second electronic device 120 is a storage device including a flash memory, the second controller 125 may operate in compliance with the interface protocol defined in the universal flash storage (UFS) specification. In this example embodiment, when the first electronic device 110 is a host, the first controller 115 may operate in compliance with the interface protocol defined in the UFS host controller interface (UFSHCI) specification. However, inventive concepts are not limited to the above-described example embodiments. In other example embodiments, when the second electronic device 120 is an image sensor, the second controller 125 may operate in compliance with an interface protocol that is called a camera serial interface (CSI). Example embodiments may be applied to any interface circuit, such as an interface circuit including a plurality of transmitters, and changes or modifications to example embodiments may be variously made according to an interfacing method.

Figure 2:
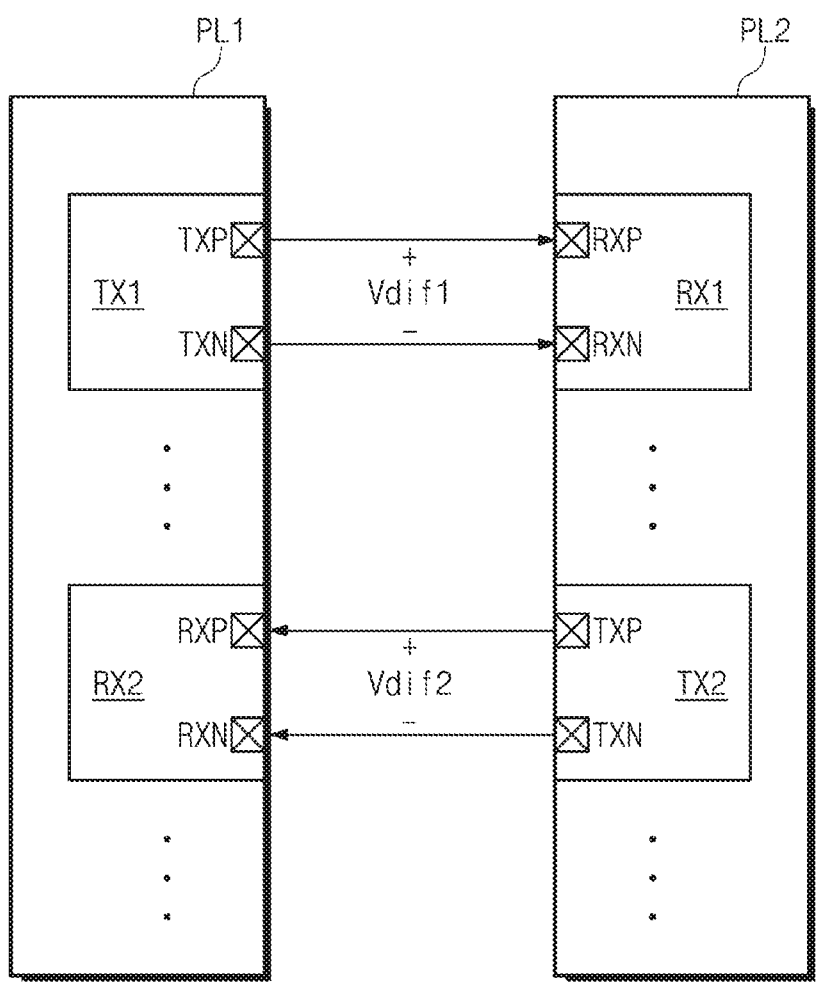
FIG. 2 is a conceptual diagram illustrating connection between interface circuits included in the electronic system of FIG. 1.

FIG. 2 is a conceptual diagram illustrating connection between interface circuits included in the two electronic devices 110 and 120 in FIG. 1. Referring to FIGS. 1 and 2, the first physical layer PL1 of the first electronic device 110 may include at least one transmitting circuit TX1 and receiving circuit RX2. The second physical layer PL2 of the second electronic device 120 may include at least one transmitting circuit TX2 and at least one receiving circuit RX1.

For example, the transmitting circuit TX1 of the first physical layer PL1 may be connected to the receiving circuit RX1 of the second physical layer PL2 through two lines. The connected receiving and transmitting circuits TX1 and RX1 may constitute a single lane. The transmitting circuit TX1 may include differential output terminals TXP and TXN. The receiving circuit RX1 may include differential input terminals RXP and RXN. The differential output terminals TXP and TXN of the transmitting circuit TX1 may be connected to the differential input terminals RXP and RXN of the receiving circuit RX1, respectively. A differential voltage Vdif1 may be generated between the differential output terminals TXP and TXN or between the differential input terminals RXP and RXN. The receiving circuit RX1 may recognize a signal or data transmitted from the transmitting circuit TX1 based on a value of the differential voltage Vdif1. The transmitting circuit TX2 and the receiving circuit RX2 may operate in the same manner as the transmitting circuit TX1 and the receiving circuit RX1.

Figure 3:
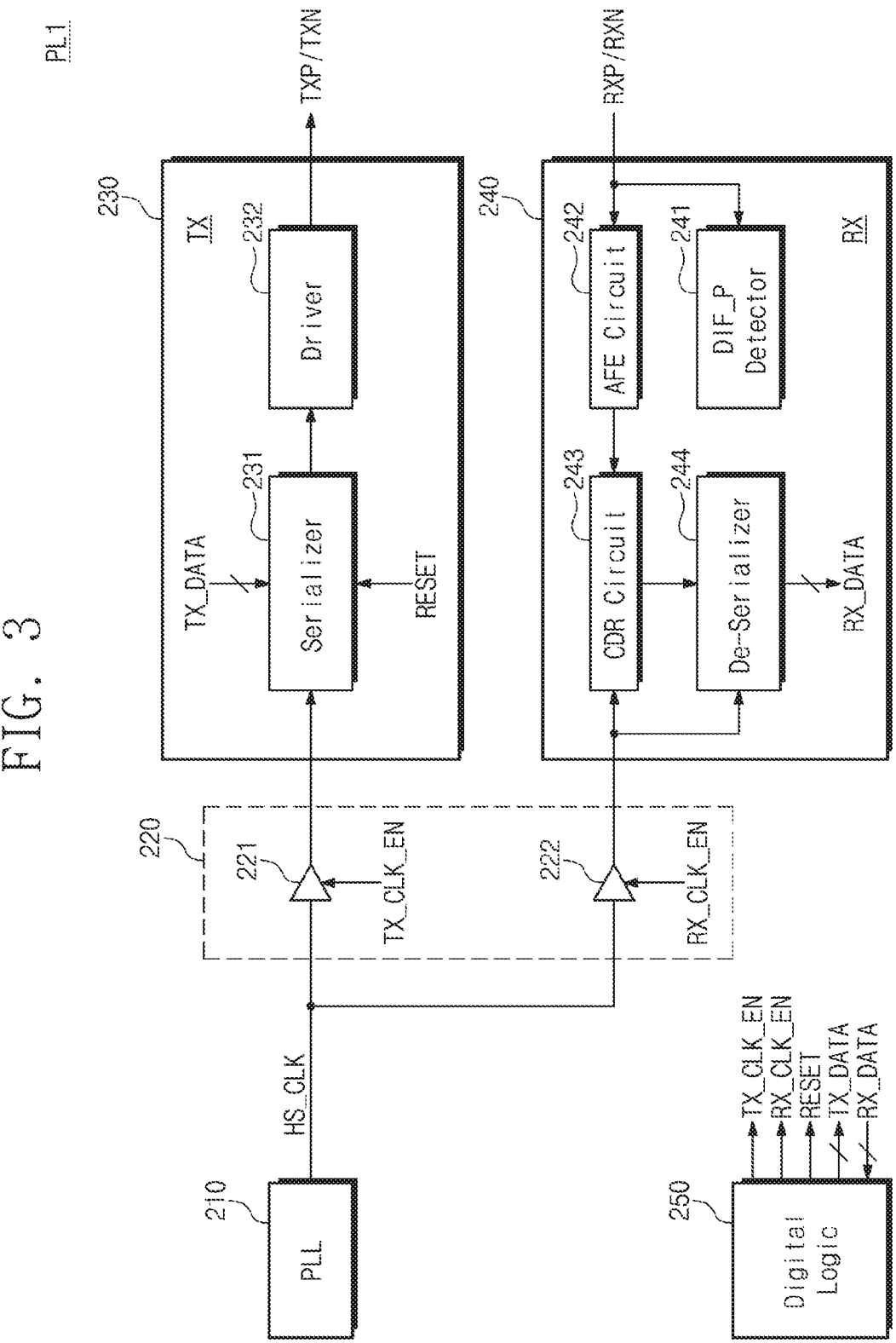
FIG. 3 is a block diagram of a transmitting circuit according to example embodiments.

FIG. 3 is a block diagram of a transmitting circuit according to example embodiments. Referring to FIG. 3, a first physical layer PL1 may include a phase-locked loop (PLL) 210, a clock switching circuit 220, a transmitting circuit (TX) 230, a receiving circuit (RX) 240, and a digital logic 250. For brevity of description, only one transmitting circuit 230 and only one receiving circuit 240 are shown in FIG. 3. However, in some example embodiments, the first physical layer PL1 may include a plurality of transmitting circuits and a plurality of receiving circuits. The first physical layer PL1 may further include other components that are not shown in FIG. 3.

The PLL 210 may provide a clock signal used to operate the transmitting circuit 230 and the receiving circuit 240. For example, in a high-speed mode, the PLL 210 may generate a high-speed clock signal HS_CLK.

The clock switching circuit 220 may provide or cut off the high-speed clock signal to the transmitting circuit 230 and the receiving circuit 240. For example, the clock switching circuit 220 may include buffers 221 and 222 that can be turned on or turned off. The buffer 221 may provide or cut off the high-speed clock signal HS_CLK to the transmitting circuit 230 according to a transmitting clock enable signal TX_CLK_EN. The buffer 222 may provide or cut off the high-speed clock signal HS_CLK to the receiving circuit 240 according to a receiving clock enable signal RX_CLK_EN.

The transmitting circuit 230 may transmit a signal to a physical layer of another device. The signal may include data. For example, the transmitting circuit 230 may transmit the signal to a receiving circuit included in a second physical layer PL2 of a second electronic device 120. The transmitting circuit 230 may include a serializer 231 and a driver 232. The driver 232 may be an example of an output circuit. The serializer 231 may receive the high-speed clock signal HS_CLK and transmission data TX_DATA. The transmission data TX_DATA may be input in parallel to the serializer 231 as data transmitted from a first electronic device 110. The serializer 231 may convert the transmission data TX_DATA into a serial data signal based on the high-speed clock signal HS_CLK. The driver 232 may receive the serial data signal and generate differential signals TXP/TXN.

The receiving circuit 240 may receive a signal from a physical layer of another device. The signal may include data. For example, the receiving circuit 240 may receive the signal from a transmitting circuit included in the second physical layer PL2 of the second electronic device 120. The receiving circuit 240 may include a differential signal (DIFF_P) detector 241, an analog front-end (AFE) circuit 242, a clock data recovery (CDR) circuit 243, and a deserializer 244. The differential signal (DIFF_P) detector 241 may receive differential signals RXP/RXN received from another device to decide a state of the receiving circuit 240. The AFE circuit 242 may change a voltage of the received differential signals RXP/RXN to be processed in the CDR circuit 243. The CDR circuit 243 may receive the high-speed clock signal HS_CLK and the differential signals RXP/RXN converted by the AFE circuit 242. The CDR circuit 243 may extract serial data from the differential signals RXP/RXN based on the high-speed clock signal HS_CLK. The deserializer 244 may deserialize the serial data from the CDR circuit 243 based on the high-speed clock signal HS_CLK to output reception data RX_DATA.

The digital logic 250 may generate signals and data used for the first physical layer PL1. For example, the digital logic 250 may generate a transmission clock enable signal TX_CLK_EN and a reception clock enable signal RX_CLK_EN to control the clock switching circuit 220. The digital logic 250 may generate a reset signal RESET to control the serializer 231. The digital logic 250 may provide the reception data TX_DATA transmitted by the first electronic device 110 in parallel to the serializer 231. The digital logic 250 may transmit the reception data RX_DATA received from another device to other intellectual properties (IPs) included in the first electronic device 110.

According to the M-PHY specification, a transmitter may operate in a high-speed mode and a low-speed mode. The transmitter has various operation states to reduce power consumption. For example, the operation state of the transmitter may include a hibernate state, a stall state (in the high-speed mode) or a sleep state (in the low-speed mode), and a burst state. In case of the hibernate state and the stall or sleep state, the transmitter does not transmit data and operates at low power. In the burst state, the transmitter transmits data and operates at normal power.

In example embodiments, the transmitting circuit 230 may reduce power consumption in the stall state of the high-speed mode. Hereinafter, the operation of the receiving circuit 230 in the stall state will now be described. In the stall state, the digital logic 250 generates the transmission clock enable signal TX_CLK_EN to cut off the high-speed clock signal HS_CLK. The digital logic 250 may provide the reset signal RESET to the serializer 231. The serializer 231 controls the driver 232 to generate differential signals TXP/TXN of the stall state irrespective of the high-speed clock signal HS_CLK. Accordingly, since the high-speed clock signal HS_CLK is not used in the serializer 231 in the stall state, power consumption may be reduced. Similarly, the serializer 231 may control the driver 232 to generate the differential signals TXP/TXN of the sleep state in the low-speed mode according to the reset signal RESET irrespective of a low-speed clock signal.

Figure 4:
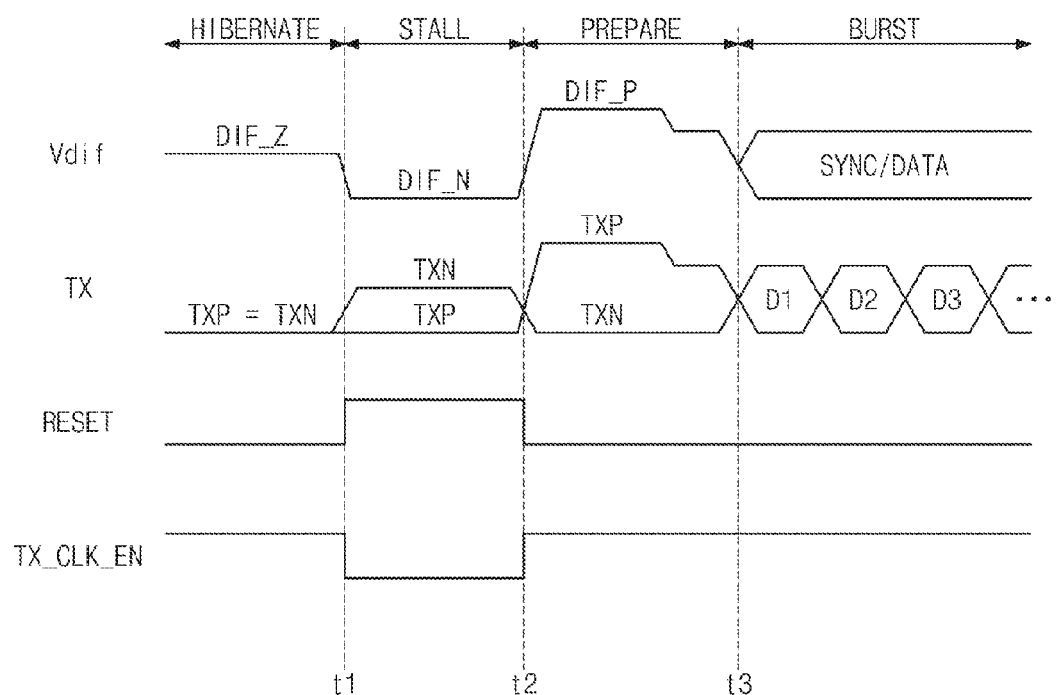
FIG. 4 is a timing diagram illustrating operation of the transmitting circuit in FIG. 3.

FIG. 4 is a timing diagram illustrating operation of the transmitting circuit 230 in FIG. 3. Referring to FIGS. 3 and 4, an example will be described where the transmitting circuit 230 operates in a high-speed mode according to the M-PHY specification. A differential voltage Vdif is a value indicating a difference between the differential signals TXP/TXN.

Prior to a first time point t1, the transmitting circuit 230 may be in a hibernate state. The differential signal TXP and the differential signal TXN have the same value. Thus, the differential voltage Vdif may have a value of DIF_Z. For example, in some example embodiments, the DIF_Z value may be substantially zero, but this is only an example. The DIF_Z value may alternatively be non-zero in some example embodiments. Prior to the first time point t1, the transmitting circuit 230 does not receive data and is maintained in a low-power state.

Between the first time point t1 and a second time point t2, the transmitting circuit 230 may be in the stall state. Between t1 and t2, the transmitting circuit 230 may receive the reset signal RESET. The transmitting circuit 230 may generate a differential signal TXN having a higher level than a differential signal TXP according to the reset signal RESET. Thus, the differential voltage Vdif may have a value of DIF_N having a lower level than the value of DIF_Z. The transmission clock enable signal TX_CLK_EN may be disabled. The clock buffer 221 may be turned off according to the transmission clock enable signal TX_CLK_EN. Thus, the high-speed clock signal HS_CLK is not provided to the serializer 231. As a result, the serializer 231 may reduce power consumption resulting from use of the high-speed clock signal HS_CLK.

Between the second time point t2 and a third time point t3, the transmitting circuit 230 may be in a prepare state. Between t2 and t3, the transmitting circuit 230 may make preparation for transmission of data D1, D2, and D3.

Following the third time point t3, the transmitting circuit 230 may be in the burst state. Following t3, the transmitting circuit 230 may transmit the data D1, D2, and D3.

Figure 5:
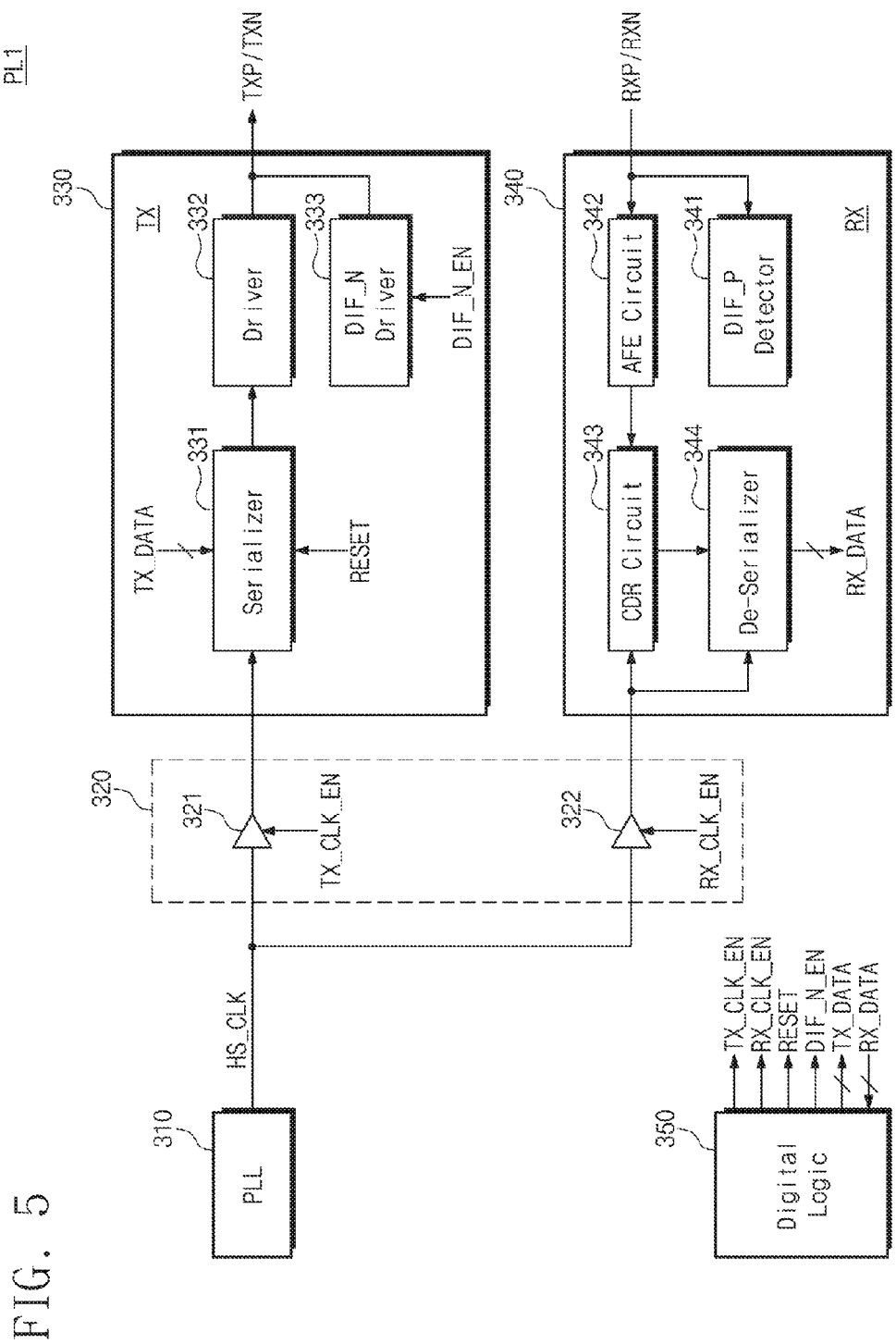
FIG. 5 is a block diagram of a transmitting circuit according to example embodiments.

FIG. 5 is a block diagram of a transmitting circuit according to example embodiments. Referring to FIG. 5, a first physical layer PL1 may include a phase-locked loop (PLL) 310, a clock switching circuit 320, a transmitting circuit (TX) 330, a receiving circuit (RX) 340, and a digital logic 350. The first physical layer PL1 in FIG. 5 may operate almost similarly to the first physical layer PL1 in FIG. 3. Therefore, similar characteristics will not be described herein. Hereinafter, description will focus on differences from the first physical layer PL1 in FIG. 3. In addition, operation of the transmitting circuit 330 will be described assuming a case of a stall state of a high-speed mode according to the M-PHY specification.

In FIG. 5, the transmitting circuit 330 may include a driver 332 and a separate standby mode (DIF_N) driver 333. That is, the standby mode (DIF_N) driver 333 may be separate from the driver 332. The driver 332 and the standby mode (DIF_N) driver 333 may be an example of an output circuit. The standby mode (DIF_N) driver 333 may receive a standby driver enable signal DIF_N_EN in a stall state. The standby mode (DIF_N) driver 333 may generate differential signals TXP/TXN of the stall state according to the standby driver enable signal DIF_N_EN. At this point, a serializer 331 may receive a reset signal RESET. The serializer 331 may be disabled according to the reset signal RESET.

The digital logic 350 may generate the reset signal RESET and the standby driver enable signal DIF_N_EN in the stall state. In case of the stall state, the transmitting circuit 330 may generate the differential signals TXP/TXN through the separate standby mode (DIF_N) driver 333 without using a high-speed clock signal HS_CLK. The serializer 331 is set to the disabled state. Thus, power consumption resulting from use of the high-speed clock signal HS_CLK by the serializer 331 may be reduced.

Figure 6:
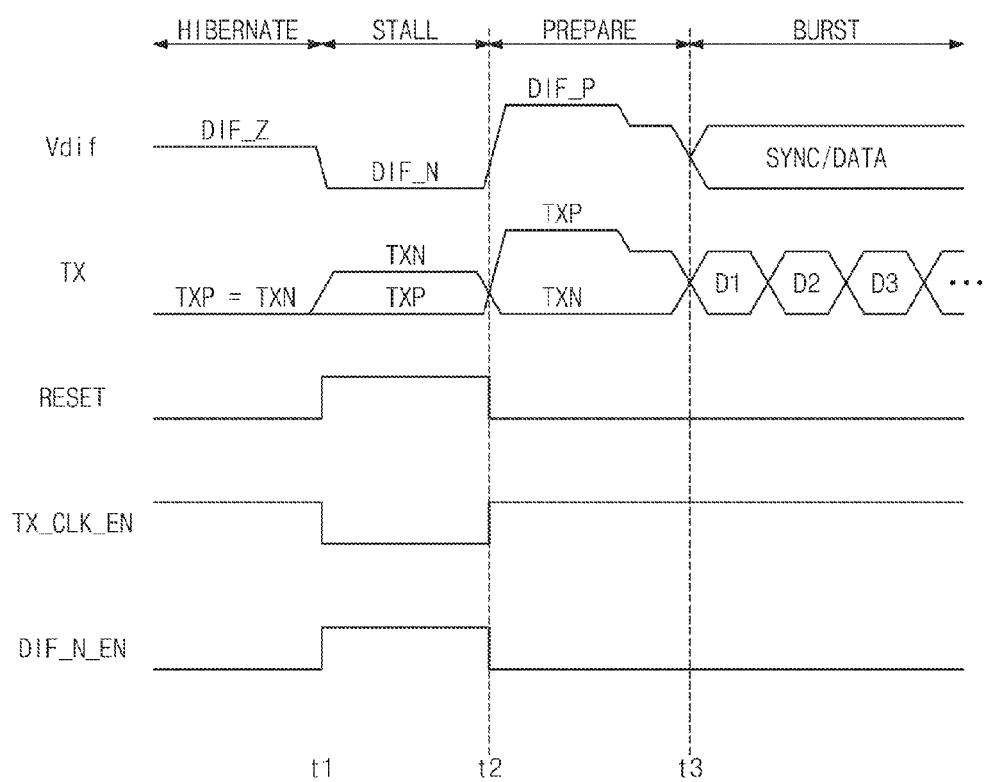
FIG. 6 is a timing diagram illustrating operation of the transmitting circuit in FIG. 5.

FIG. 6 is a timing diagram illustrating operation of the transmitting circuit 330 in FIG. 5. Referring to FIGS. 5 and 6, an example will be described where the transmitting circuit 330 operates in a high-speed mode according to the M-PHY specification. A differential voltage Vdif is a value indicating a difference between the differential signals TXP/TXN.

Prior to a first time point t1, the transmitting circuit 330 may be in a hibernate state. The differential signal TXP and the differential signal TXN have the same value. Thus, the differential voltage Vdif may have a value of DIF_Z. For example, in some example embodiments, the DIF_Z value may be substantially zero, but this is only an example. The DIF_Z value may alternatively be non-zero in some example embodiments. Prior to t1, the transmitting signal 330 does not receive data and is maintained at a low-power state.

Between the first time point t1 and a second time point2, the transmitting circuit 330 may be in a stall state. Between t1 and t2, the transmitting circuit 330 may receive a reset signal RESET. The transmitting circuit 330 may disable the serializer 331 according to the reset signal RESET. A transmission clock enable signal TX_CLK_EN may be disabled. The clock buffer 321 may be turned off according to the transmission clock enable signal TX_CLK_EN. Thus, the high-speed clock signal HS_CLK is not provided to the serializer 331. As a result, power consumption resulting from use of the high-speed clock signal HS_CLK by the serializer 331 may be reduced. Moreover, the serializer 331 is disabled itself to reduce power consumption.

The separate standby mode (DIF_N) driver 333 may generate a differential signal TXN having a higher level than a differential signal TXP according to the standby driver enable signal DIF_N_EN. Thus, the differential voltage Vdif may have a value of DIF_N having a lower level than DIF_Z.

Between the second time point t2 and a third time point t3, the transmitting circuit 330 may be in a prepare state. Between t2 and t3, the transmitting circuit 330 may make preparation for transmission of data D1, D2, and D3.

Following the third time point t3, the transmitting circuit 330 may be in a burst state. Following t3, the transmitting circuit 330 may transmit the data D1, D2, and D3.

Figure 7:
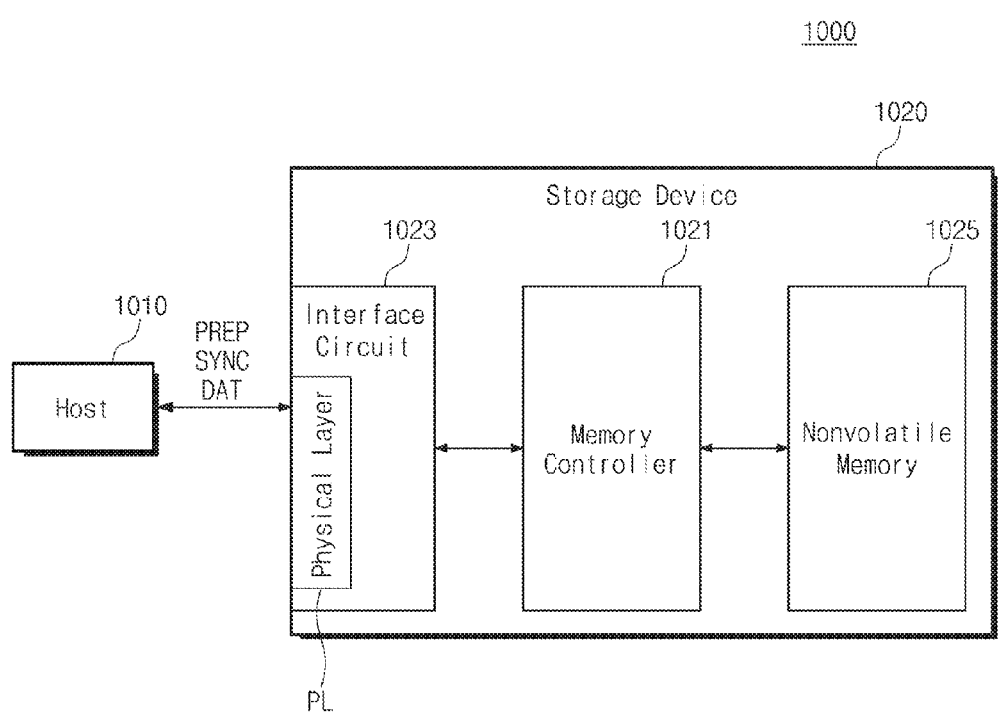
FIG. 7 is a block diagram illustrating the configuration of a storage system according to example embodiments.

FIG. 7 is a block diagram illustrating the configuration of a storage system 1000 according to example embodiments. As illustrated, the storage system 1000 may include a host 1010 and a storage device 1020.

For example, the host 1010 may be the first electronic device 110 in FIG. 1. In example embodiments, when the storage system 1000 is implemented in a mobile electronic system, the host 1010 may include an application processor.

For example, the storage device 1020 may be the second storage device 120 in FIG. 1. The storage device 1020 may include a memory controller 1021, an interface circuit 1023, and a nonvolatile memory 1025. The interface circuit 1023 may include a physical layer PL. However, the storage device 1020 may further include other components that are not shown in FIG. 7. The components are merely exemplary for understanding of inventive concepts.

The memory controller 1021 may manage and control the overall operation of the storage device 1020. In particular, the memory controller 1021 may process and manage data exchanged with the host 1010 through the interface circuit 1023. The storage device 1020 may perform its own function according to the control of the memory controller 1021.

In some example embodiments, the memory controller 1021 may control the storage device 1020 according to a signal reception prepare command PREP, a synchronization command SYNC, and the like provided through the interface circuit 1023. In other example embodiments, the memory controller 1021 may store data DAT provided from the host 1010 through the interface circuit 1023 in the nonvolatile memory 1025. Alternatively, the memory controller 1021 may provide data DAT stored in the nonvolatile memory 1025 through the interface circuit 1023 to the host 1010.

In example embodiments, the memory controller 1021 may control the storage device 1020 according to the UFS interface protocol, but inventive concepts are not limited to the example embodiments. For example, the memory controller 1021 may control the storage device 1020 according to at least one of various interface protocols such as USB (Universal Serial Bus), SCSI (Small Computer System Interface), PCIe (Peripheral Component Interconnect Express), M-PCIe (Mobile PCIe), ATA (Advanced Technology Attachment), PATA (Parallel ATA), SATA (Serial ATA), SAS (Serial Attached SCSI), and IDE (Integrated Drive Electronics).

The interface circuit 1023 may include a physical layer PL. The interface circuit 1023 may operate according to an interface protocol using the physical layer PL. In particular, the interface circuit 1023 may be configured to receive a differential signal from the host 1010.

In example embodiments, when the storage device 1020 is implemented in a mobile electronic system, the physical layer PL may be defined by the M-PHY specification. However, inventive concepts are not limited to the example embodiments. The physical layer PL may include physical components (e.g., one or more transmitting circuits and one or more receiving circuits) to exchange data with the host 1010. In particular, each of the one or more receiving circuits included in the physical layer PL of the interface circuit 1023 may be implemented based on example embodiments. Similarly, each of the one or more transmitting circuits included in the physical layer PL of the interface circuit 1023 may be implemented based on example embodiments described above.

More specifically, the transmitting circuit included in the physical layer PL of the interface circuit 1023 may have the configuration of the transmitting circuit TX shown in FIG. 3 or 5. As descried with reference to FIGS. 3 to 6, the transmitting circuit included in the physical layer PL of the interface circuit 1023 may reduce power consumption in the stall state according to the M-PHY specification.

The nonvolatile memory 1025 may store data irrespective of whether power is supplied or not. In particular, the nonvolatile memory 1025 may be configured to store data corresponding to a differential signal received through the interface circuit 1023. The nonvolatile memory 1025 may store or output data according to the control of the memory controller 1021.

In some example embodiments, the memory controller 1021, the interface circuit 1023, and the nonvolatile memory 1025 may be implemented in an embedded storage configured to be embedded in a mobile electronic system. In other example embodiments, the memory controller 1021, the interface circuit 1023, and the nonvolatile memory 1025 may be implemented in a card storage configured to be connected to a mobile electronic system. However, inventive concepts are not limited to the above example embodiments. The storage device 1020 may be implemented with another type of storage.

Figure 8:
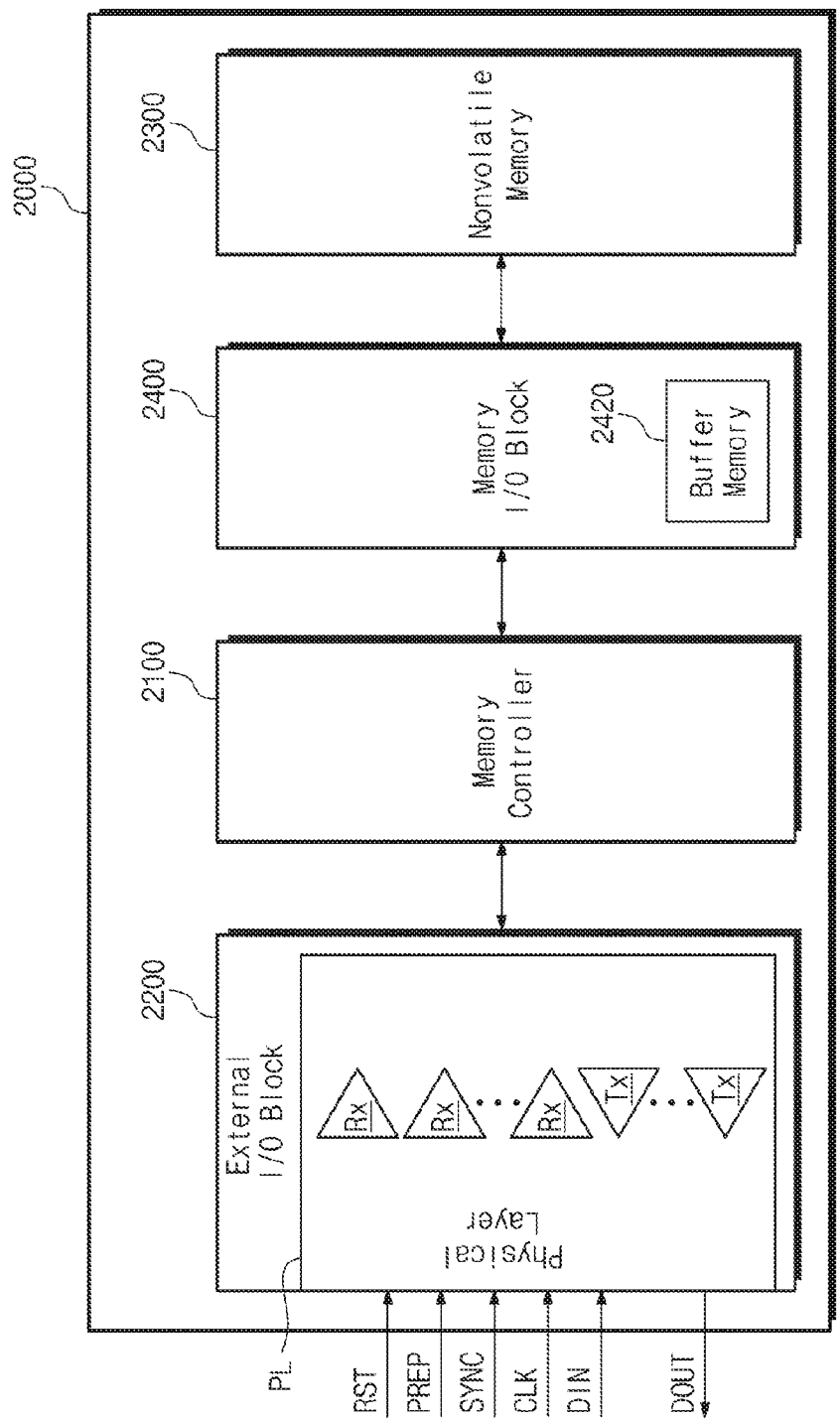
FIG. 8 is a block diagram illustrating the configuration of an embedded storage according to example embodiments.

FIG. 8 is a block diagram illustrating the configuration of an embedded storage 2000 according to example embodiments. As illustrated, the embedded storage 2000 may include a memory controller 2100, an external input/output (I/O) block 2200, a nonvolatile memory 2300, and a memory input/output (I/O) block 2400. However, the configuration shown in FIG. 8 is merely exemplary for understanding of inventive concepts. Alternatively, in some example embodiments, the embedded storage 2000 may omit at least one of the components shown in FIG. 8.

The memory controller 2100 may manage and control the overall operation of the embedded storage 2000. In particular, the memory controller 2100 may manage and control data exchanged with a host through the external I/O block 2200.

In some example embodiments, the memory controller 2100 may control the embedded storage 2000 according to a reset signal RST, a signal reception prepare command PREP, a synchronization command SYNC, a clock signal CLK, and the like provided through the external I/O block 2200. In other example embodiments, the memory controller 2100 may store data DIN provided from the host through the external I/O block 2200 in the nonvolatile memory 2300 through the memory I/O block 2400. Alternatively, in other example embodiments, the memory controller 2100 may provide data DOUT stored in the nonvolatile memory 2300 through the external I/O block 2200 to the host.

In some example embodiments, the memory controller 2100 may control the embedded storage 23000 according to the UFS interface protocol. However, inventive concepts are not limited to the example embodiments. For example, the memory controller 2100 may control the embedded storage 2000 according to at least one of various interface protocols such as USB, SCSI, PCIe, M-PCIe, ATA, PATA, SATA, SAS, and IDE.

The external I/O block 2200 may exchange signals and data with an external device or system. The I/O block 2200 may include a physical layer PL. The I/O block 2200 may operate according to an interface protocol using the physical layer PL. In example embodiments, the external I/O block 2200 may be configured to receive a differential signal from the host.

In some example embodiments, when the embedded storage 2000 is implemented in a mobile electronic system, the physical layer PL may be defined by the M-PHY specification. However, inventive concepts are not limited to the example embodiments. The physical layer PL may include one or more transmitting circuits TX and one or more receiving circuits RX to exchange data with the host. In particular, each of the one or more receiving circuits RX included in the physical layer PL of the external I/O block 2200 may be implemented based on example embodiments described above.

More specifically, the transmitting circuit included in the physical layer PL of the external I/O block 2200 may have the configuration of the transmitting circuit TX shown in FIG. 3 or 5. As described with reference to FIGS. 3 to 6, the transmitting circuit included in the physical layer PL of the eternal I/O circuit 2200 may reduce power consumption in the stall state according to the M-PHY specification.

The nonvolatile memory 2300 is a memory configured to perform functions of the embedded storage 2000. The nonvolatile memory 2300 may store data irrespective of whether power is supplied. In particular, the nonvolatile memory 2300 may be configured to store data corresponding to the differential signal received through the external I/O block 2200. For example, the nonvolatile memory 2300 may be one of NAND-type flash Memory, NOR-type flash Memory, phase-change random access memory (PRAM), magneto-resistive RAM (MRAM), resistive RAM (ReRAM), and ferroelectric RAM (FRAM). Alternatively, the nonvolatile memory 2300 may include heterogeneous memories.

The memory I/O block 2400 may process a write operation to write data into the nonvolatile memory 2300 and a read operation to read data from the nonvolatile memory 2300. For example, the memory I/O block 2400 may include a buffer memory 2420 to temporarily buffer data. Although not shown in FIG. 8, the memory I/O block 2400 may further include other components, such as an address decoder and a sense amplifier, which are used to input/output data.

Figure 9:
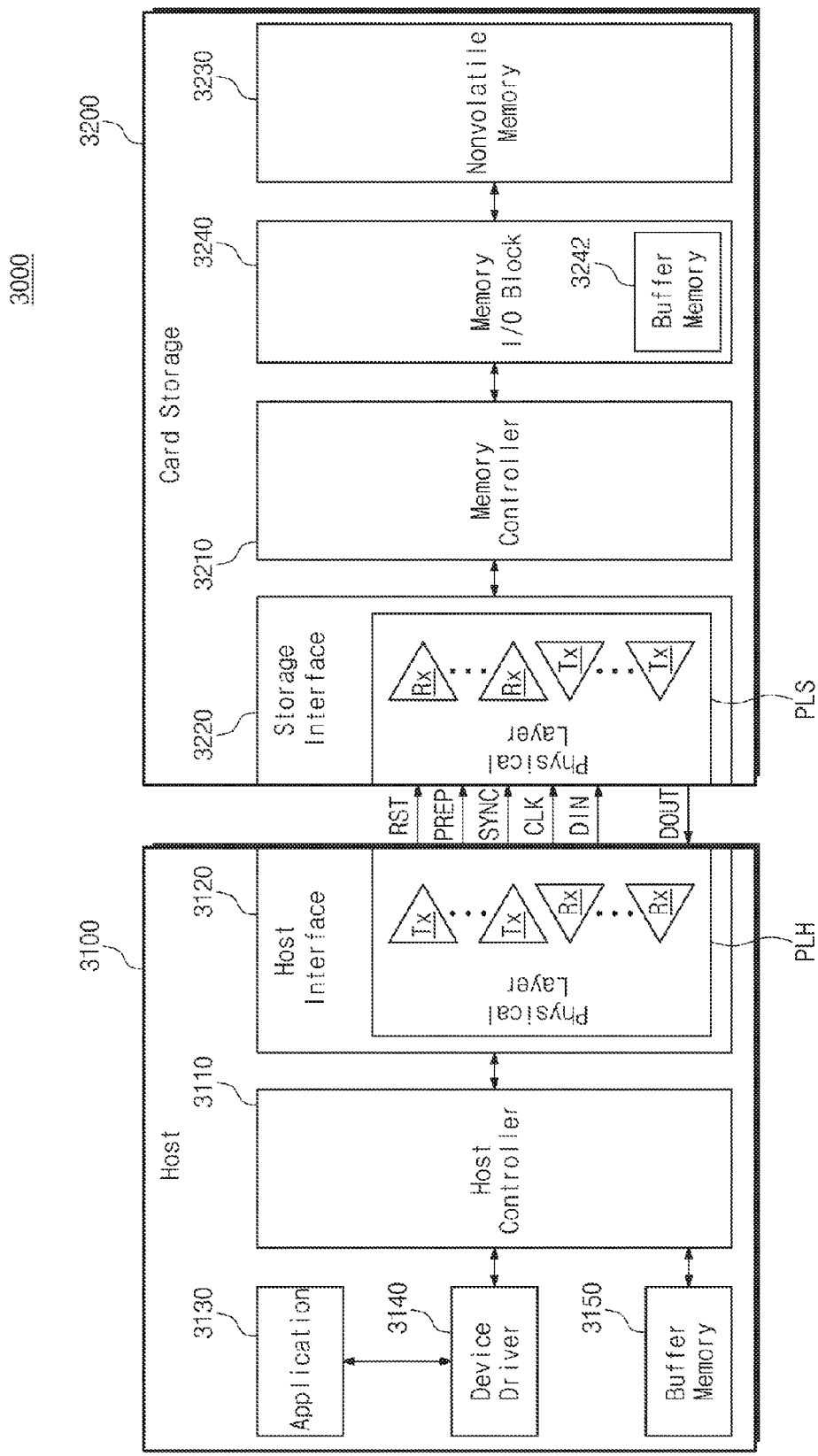
FIG. 9 is a block diagram illustrating a configuration of a storage system including a card storage according to example embodiments.

FIG. 9 is a block diagram illustrating the configuration of a storage system 3000 including a card storage according to example embodiments. As illustrated, the storage system 3000 includes a host 3100 and a card storage 3200.

The host 3100 may include a host controller 3110, a host interface 3120, an application 3130, a device driver 3140, and a buffer memory 3150. However, the configuration of the host 3100 shown in FIG. 9 is merely exemplary for understanding of inventive concepts. The host 3100 may further include components that are not shown in FIG. 9. Alternatively, the host 3100 may omit at least one of the components shown in FIG. 9.

The host controller 3110 may manage and control the overall operation of the host 3100. The host controller 3110 may process and manage data exchanged with the card storage 3200 through the host interface 3120. In some example embodiments, the host controller 3110 may control the host 3100 according to UFSHCI interface protocol. However, inventive concepts are not limited to the example embodiments.

The host interface 3120 may provide various types of commands (e.g., a signal reception prepare command PREP, a synchronization command SYNC, etc.) and signals (e.g., a reset signal RST, a block signal CLK, etc.) to the card storage 3200. Moreover, the host interface 3120 may exchange data (e.g., input data DIN, output data DOUT, etc.) with the card storage 3200. The host interface 3120 may include a physical layer PLH. The host interface 3120 may communicate with the card storage 3200 according to an interface protocol using the physical layer PLH. In some example embodiments, the host interface 3120 may be configured to transmit a differential signal to the card storage 3200.

In some example embodiments, when the storage system 3000 is implemented in a mobile electronic system, the physical layer PLH may be defined by M-PHY specification. However, inventive concepts are not limited to the example embodiments. The physical layer PLH may include one or more transmitting circuits Tx and one or more receiving circuits Rx to exchange signals and data with the card storage 3200. In particular, each of the one or more receiving circuits Rx included in the physical layer PLH of the host interface 3120 may be implemented based on example embodiments described above. Similarly, each of the one or more transmitting circuits Tx included in the physical layer PLH of the host interface 3120 may be implemented based on example embodiments described above.

More specifically, the transmitting circuit Tx included in the physical layer PL of the host interface 3120 may have the configuration of the transmitting circuit TX shown in FIG. 3 or 5. As described with reference to FIGS. 3 to 6, the transmitting circuit included in the physical layer PL of the host interface 3120 may reduce power consumption in a stall state according to M-PHY specification.

The application 3130 may manage many types of application programs executed in the host 3100. The device driver 3140 may manage and drive peripheral devices connected to the host 3100. In the example embodiments in FIG. 9, the device driver 3140 may drive the card storage 3200.

The application 3130 and the device driver 3140 may be implemented with a program command, e.g., firmware.

The buffer memory 3150 may temporarily buffer data processed in the host 3100. For example, the buffer memory 3150 may include a volatile memory such as static RAM (SRAM), dynamic RAM (DRAM), and synchronous DRAM (SDRAM) and a nonvolatile memory such as flash memory, PRAM, MRAM, ReRAM, and FRAM.

The card storage 3200 may include a memory controller 3210, a storage interface 3220, a nonvolatile memory 3230, and a memory input/output (I/O) block 3240. However, the configuration of the card storage 3200 shown in FIG. 9 is merely exemplary for understanding of inventive concepts. The card storage 3200 may further include other components that are not shown in FIG. 9. Alternatively, the card storage 3200 may omit at least one of the components shown in FIG. 9.

The memory controller 3210 may manage and control the overall operation of the card storage 3200. The memory controller 3210 may process and manage data exchanged with the host 3100 through the storage interface 3220. In some example embodiments, the memory controller 3210 may control the card storage 3200 according to UFS interface protocol. However, inventive concepts are not limited to the example embodiments.

In some example embodiments, the memory controller 3210 may control the card storage 3200 according to a reset signal RST, a signal reception prepare command PREP, a synchronization command SYNC, a clock signal CLK, and the like provided from the host 3100 through the storage interface 3220. In other example embodiments, the memory controller 3210 may store data DIN provided from the host 3100 through the storage interface 3220 in the nonvolatile memory 3230 through the memory I/O block 3240. Alternatively, in some example embodiments, the memory controller 3210 may provide data DOUT stored in the nonvolatile memory 3230 through the storage interface 3220 to the host 3100.

The storage interface 3220 may receive various types of commands (e.g., a signal reception prepare command PREP, a synchronization command SYNC, etc.) and signals (e.g., a reset signal RST, a block signal CLK, etc.) from the host 3100. Moreover, the storage interface 3220 may exchange data (e.g., input data DIN, output data DOUT, etc.) with the host 3100. The storage interface 3220 may include a physical layer PLS. The storage interface 3220 may operate according to an interface protocol using the physical layer PLS. In example embodiments, the storage interface 3220 may be configured to receive a differential signal from the host 3100.

In some example embodiments, when the storage system 3000 is implemented in a mobile electronic system, the physical layer PLS may be defined by M-PHY specification. However, inventive concepts are not limited to the example embodiments. The physical layer PLS may include one or more transmitting circuits Tx and one or more receiving circuits Rx to exchange data with the host 3100. In particular, each of the one or more receiving circuits Rx included in the physical layer PLS of the storage interface 3220 may be implemented based on example embodiments described above. Similarly, each of the one or more transmitting circuits Tx included in the physical layer PLS of the storage interface 3220 may be implemented based on example embodiments described above.

More specifically, the transmitting circuit included in the physical layer PL of the storage interface 3220 may have the configuration of the transmitting circuit TX shown in FIG. 3 or 5. As described with reference to FIGS. 3 to 6, the transmitting circuit included in the physical layer PLS of the storage interface 3220 may reduce power consumption in a stall state according to the M-PHY specification.

The nonvolatile memory 3230 may be a memory configured to preform own functions of the card storage 3200. The nonvolatile memory 3230 may storage data irrespective of whether power is supplied. In particular, the nonvolatile memory 3230 may be configured to store data corresponding to a differential signal received through the external I/O block 3220. The nonvolatile memory 3230 may store or output data according to the control of the memory controller 3210. For example, the nonvolatile memory 3230 may be one of flash Memory, phase-change random access memory (PRAM), magneto-resistive RAM (MRAM), resistive RAM (ReRAM), and ferroelectric RAM (FRAM). Alternatively, the nonvolatile memory 3230 may include heterogeneous memories.

The memory I/O block 3240 may process a write operation to write data into the nonvolatile memory 3230 and a read operation to read data from the nonvolatile memory 3230. For example, the memory I/O block 3240 may include a buffer memory 3242 to temporarily buffer data. For example, the buffer memory 3242 may include a volatile memory such as SRAM, DRAM, and SDRAM or a nonvolatile memory such as PRAM, MRAM, ReRAM, and FRAM. Although not shown in FIG. 9, the memory I/O block 3240 may further include other components, such as an address decoder and a sense amplifier, which are used to input/output data.

In FIGS. 8 and 9, configurations of a storage device implemented based on example embodiments of inventive concepts have been described. However, as mentioned above, inventive concepts may be applied to any interface circuits using a physical layer. FIGS. 8 and 9 are not intended to limit inventive concepts.

Figure 10:
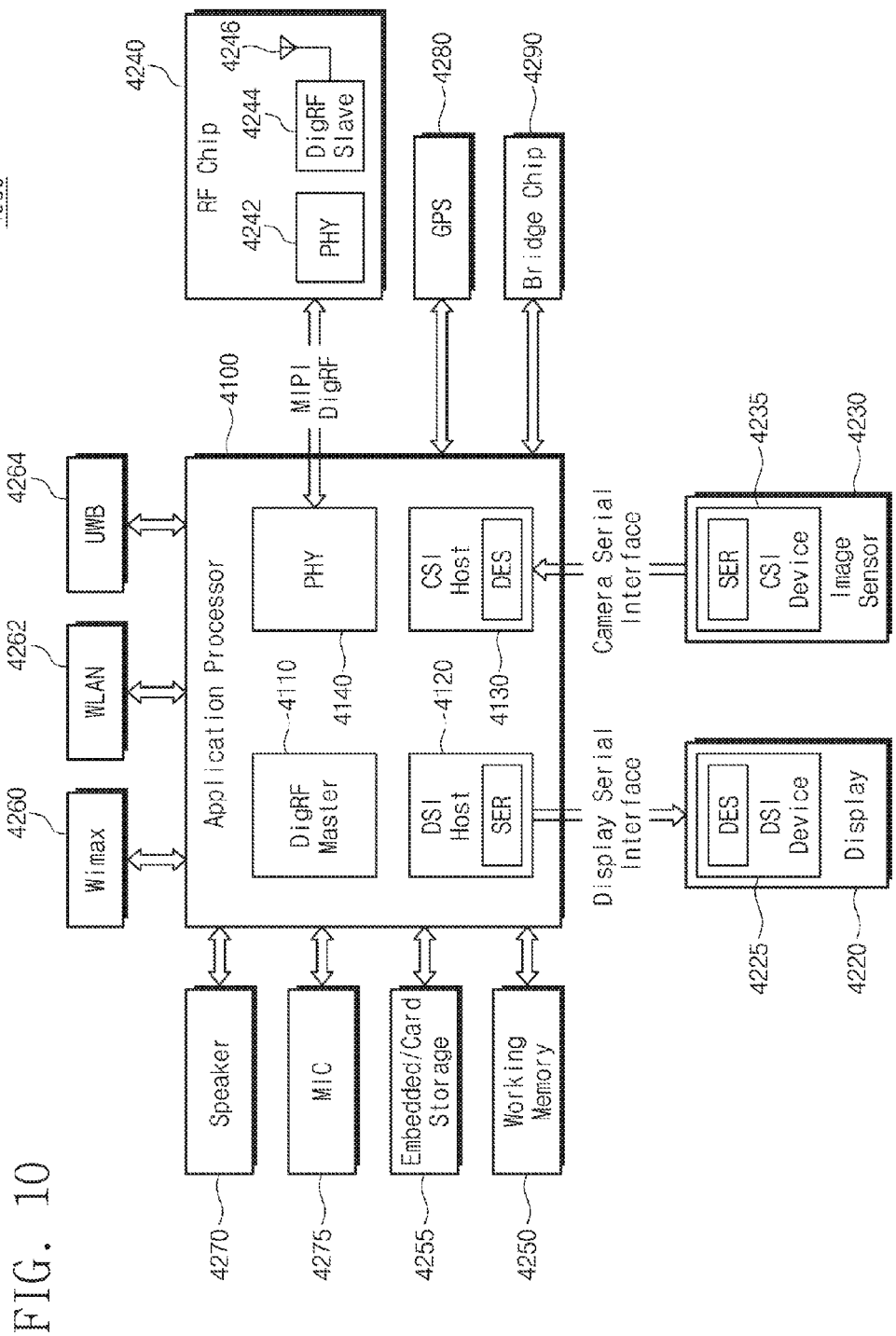
FIG. 10 is a block diagram illustrating a configuration of an electronic system including a transmitting circuit according to example embodiments and interfaces operating according to example embodiments.

FIG. 10 is a block diagram illustrating the configuration of an electronic system 4000 including a transmitting circuit according to example embodiments and interfaces operating according to example embodiments. The electronic system 4000 may be implemented with a data processing device capable of using or supporting an interface proposed by the MIPI Alliance. For example, the electronic system 4000 may be implemented in the form of a mobile communication terminal, a personal digital assistant (PDA), a portable multimedia player (PMP), a smartphone or a wearable device.

The electronic system 4000 may include an application processor 4100, a display 4220, and an image sensor 4230. The application processor 4100 may include a digital radio-frequency (DigRF) master 4110, a display serial interface (DSI) host 4120, a camera serial interface (CSI) host 4130, and a physical layer 4140.

The DSI host 4120 may communicate with a DSI device 4225 of the display 4220 according to DSI. For example, an optical serializer SER may be implemented in the DSI host 4120. For example, an optical deserializer DES may be implemented in the DSI device 4225.

The CSI host 4130 may communicate with the CSI device 4235 of the image sensor 4230 according to CSI. For example, an optical deserializer DES may be implemented in the CSI host 4130. For example, an optical serializer SER may be implemented in the CSI device 4235.

The DSI and the CSI may use a physical layer. The DSI and the CSI may employ example embodiments described above. For example, a transmitting circuit included in a physical layer PL of each of the DSI host 4120, the DSI device 4225, the CSI device 4235, and the CSI host 4130 may have the configuration of the transmitting circuit TX shown in FIG. 3 or 5. As described with reference to FIGS. 3 to 6, a transmitting circuit included in the physical layer PL of each of the DSI host 4120, the DSI device 4225, the CSI device 4235, and the CSI host 4130 may reduce power consumption in a stall state according to M-PHY specification.

The electronic system 4000 may further include a radio-frequency (RF) chip 4240 communicating with the application processor 4100. The RF chip 4240 may include a physical layer 4242, a DigRF slave 4244, and an antenna 4246. For example, the physical layer 4242 of the RF chip 4240 and the physical layer 4140 of the application processor 4100 may exchange data with each other due to a DigRF interface proposed by the MIPI Alliance. The DigRF interface may employ example embodiments described above. For example, a transmitting circuit included in each of the physical layers 4140 and 4242 may have the configuration of the transmitting circuit TX shown in FIG. 3 or 5. As described with reference to FIGS. 3 to 6, the transmitting circuit included in each of the physical layers 4140 and 4242 may reduce power consumption in a stall state according to the M-PHY specification.

The electronic system 4000 may further include a working memory 3250 and an embedded/card storage 4255. The working memory 4250 and the embedded/card storage 4255 may store data received from the application processor 4100. Moreover, the working memory 4250 and the embedded/card storage 4255 may provide stored data to the application processor 4100.

The working memory 4250 may temporarily store data processed by the application processor 4100 or data to be processed by the application processor 4100. The working memory 4250 may include a volatile memory such as SRAM, DRAM, and SRAM or a nonvolatile memory such as PRAM, MRAM, ReRAM, and FRAM.

The embedded/card storage 4255 may store data irrespective of whether power is supplied. In some example embodiments, the embedded/card storage 4255 may operate according to a UFS interface protocol. However, inventive concepts are not limited to the example embodiments. In the example embodiments, a transmitting circuit included in a physical layer of the embedded/card storage 4255 may have the configuration of the transmitting circuit TX shown in FIG. 3 or 5. As described with reference to FIGS. 3 to 6, the transmitting circuit includes the physical layer of the embedded/card storage 4255 may reduce power consumption in the stall state according to the M-PHY specification.

The electronic system 4000 may communicate with an external system through world interoperability for microwave access (WiMax) 4260, wireless local area network (WLAN) 4262, and ultra wideband (UWB) 4264. In example embodiments, a transmitting circuit included in a physical layer of the WLAN 4262 may have the configuration of the transmitting circuit TX shown in FIG. 3 or 5. As described with reference to FIGS. 3 to 6, the transmitting circuit included in the physical layer of the WLAN 4262 may reduce power consumption in the stall state according to the M-PHY specification.

The electronic system may further include a speaker 4270 and a microphone 4275 to process audio information. The electronic system 4000 may further include a global positioning system (GPS) device 4280 to process location-based information.

The electronic system 4000 may further include a bridge chip 4290 to manage a connection with peripheral devices.

In example embodiments, a transmitting circuit included in a physical layer of the bridge chip 4290 may have the configuration of the transmitting circuit TX shown in FIG. 3 or 5. As described with reference to FIGS. 3 to 6, the transmitting circuit included in the physical layer of the bridge chip 4290 may reduce power consumption in the stall state according to the M-PHY specification.

As described so far, use of a clock signal provided through a serializer of a transmitting circuit is blocked in a standby state to reduce power consumption.

The above-disclosed subject matter is to be considered illustrative, and not restrictive, and the appended claims are intended to cover all such modifications, enhancements, and other features, which fall within the true spirit and scope of inventive concepts. Thus, to the maximum extent allowed by law, the scope of inventive concepts is to be determined by the broadest permissible interpretation of the following claims and their equivalents, and shall not be restricted or limited by the foregoing detailed description. While some example embodiments have been particularly shown and described, it will be understood by one of ordinary skill in the art that variations in form and detail may be made therein without departing from the spirit and scope of the claims.

What is claimed is:

1. A transmitting circuit comprising:
   a serializer configured to convert parallel data into serial data based on a clock signal;
   a driver configured to generate differential signals based on the serial data;
   a clock buffer configured to provide the clock signal to the serializer; and
   a digital logic configured to provide the parallel data to the serializer and to generate a reset signal and a transmit clock enable signal controlling the clock buffer,
   wherein in a standby state, the clock buffer cuts off the clock signal and the serializer controls the driver according to the reset signal such that standby differential signals indicating the standby state are generated by the driver irrespective of the clock signal.

2. The transmitting circuit as set forth in claim 1, wherein the transmit clock enable signal is disabled in the standby state.

3. The transmitting circuit as set forth in claim 1, wherein the standby differential signals include first and second differential signals and a difference value between the first and second differential signals has a lower value than a difference value between the differential signals when the differential signals are the same.

4. The transmitting circuit as set forth in claim 1, wherein the serializer and the driver are included in a physical layer.

5. A transmitting circuit comprising:
   a serializer configured to convert parallel data into serial data based on a clock signal;
   a driver configured to generate differential signals based on the serial data; and
   a standby mode driver configured to generate, in a standby state, standby differential signals indicating the standby state independently of a state of the serializer in the standby state,
   wherein in the standby state, the serializer is disabled according to a reset signal and the standby mode driver outputs the standby differential signals.

6. The transmitting circuit as set forth in claim 5, wherein the standby mode driver operates independently of the driver, and operates according to a standby driver enable signal.

7. The transmitting circuit as set forth in claim 6, wherein the standby driver enable signal is enabled such that the differential signals indicating the standby state are output by the standby mode driver.

8. The transmitting circuit as set forth in claim 5, further comprising:
   a clock buffer configured to provide the clock signal to the serializer.

9. The transmitting circuit as set forth in claim 8, further comprising:
   a digital logic configured to generate the reset signal and a transmit clock enable signal controlling the clock buffer.

10. The transmitting circuit as set forth in claim 9, wherein the transmit clock enable signal is disabled in the standby state.

11. The transmitting circuit as set forth in claim 9, wherein the digital logic provides the parallel data to the serializer.

12. The transmitting circuit as set forth in claim 5, wherein the standby differential signals include first and second differential signals and a difference value between the first and second differential signals has a lower value than a difference value between the differential signals when the differential signals are the same.

13. The transmitting circuit as set forth in claim 5, wherein the serializer and the driver are included in a physical layer defined based on a Mobile Industry Processor Interface (MIPI) M-PHY specification.

14. A transmitting circuit comprising:
   a digital logic configured to generate control signals to operate the transmitting circuit in a hibernate state, a stall state, a prepare state, and a burst state;
   an output circuit configured to generate and output differential signals; and
   a clock buffer configured to buffer a clock signal based on one of the control signals,
   wherein when the digital logic generates the control signals to operate the transmitting circuit in the stall state, the clock buffer cuts off the clock signal based on one of the control signals, and the output circuit outputs stall state differential signals whose difference value is less than a difference value of the differential signals output in each of the burst state, the prepare state, and the hibernate state.

15. The transmitting circuit as set forth in claim 14, further comprising a serializer configured to convert parallel data into serial data based on the clock signal,
    wherein, the output circuit comprises a driver, and
    wherein in the stall state, the digital logic generates a reset signal to reset the serializer, and the driver outputs the stall state differential signals in the stall state based on a reset signal output from the serializer.

16. The transmitting circuit as set forth in claim 14, further comprising a serializer configured to convert parallel data into serial data based on the clock signal,
    wherein, the output circuit comprises a driver that is configured to output the differential signals, and a standby mode driver that is separate from the driver and is configured to output the stall state differential signals, and
    wherein in the stall state, the digital logic generates a reset signal to reset the serializer, and generates a control signal to control the standby mode driver to output the stall state differential signals in the stall state.

17. The transmitting circuit as set forth in claim 15, wherein the serializer and the driver are included in a physical layer defined based on a Mobile Industry Processor Interface (MIPI) M-PHY specification.

18. The transmitting circuit as set forth in claim 16, wherein the serializer, the driver, and the standby mode driver are included in a physical layer defined based on a Mobile Industry Processor Interface (MIPI) M-PHY specification.

* * * * *